Patented Aug. 14, 1945

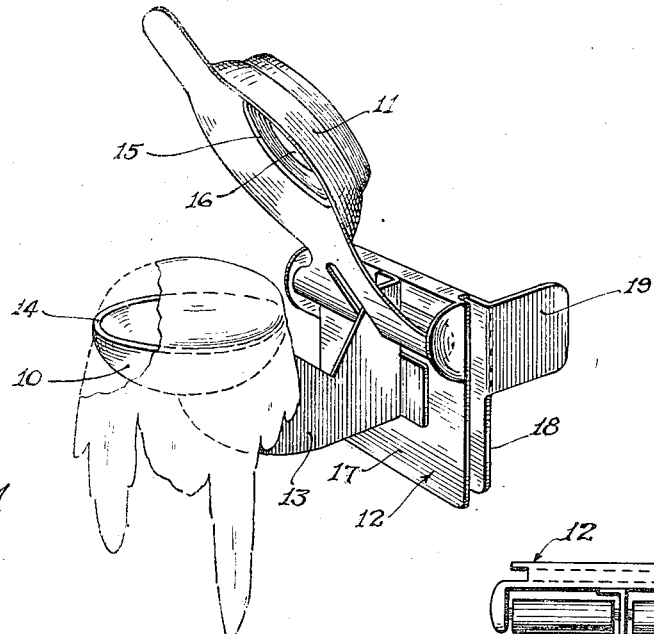
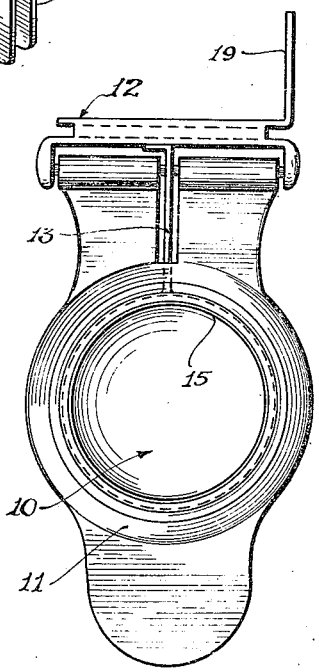
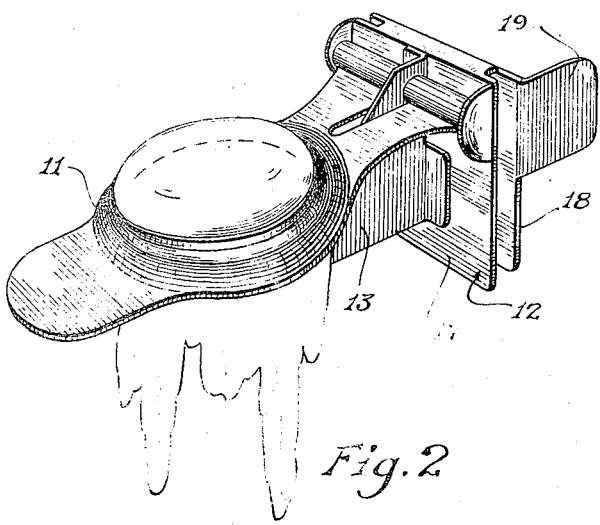

2,382,737

UNITED STATES PATENT OFFICE 2,382,737

EGG SEPARATOR

Leon D. Mink, Chicago, Ill., assignor to Industrial Patents Corporation, Chicago, Ill., a corporation of Delaware Application September 23, 1943, Serial No. 503,456

1 Claim. (Cl. 146—2)

This invention relates to a device for separating egg yolks from egg whites, and more particularly to a device for grading the yolk as to color at the time of separation.

It is an object of this invention to provide a means for speedily grading egg yolks according to color.

Another object of this invention is to provide a grading means for selectively grading each individual egg yolk as it is separated from its associated egg white.

Other objects of the invention will appear more fully from the specification below.

Referring to the drawing:

Figure 1 shows a perspective view of the egg separator provided with the present invention, Figure 2 is a perspective view of the egg separator of this invention showing the white being trimmed from the yellow, and Figure 3 is a plan view of the separator shown in Figure 2.

In preparing egg products for the trade, in certain instances, the whites and yolks are separated and, quite frequently, the separated portions of the egg are either frozen or dried to be preserved. The bakery trade is a large user of preserved egg whites, yolks, and in certain of the bakery products, a deep yellow color is particularly desired, e. g. noodles and some types of cakes. To accommodate this trade, it is, therefore, necessary to grade the yolks as to color in order that the bakers may obtain those which will impart more color to their goods.

In manufacturing mayonnaise, noodles, yellow cake and other products wherein eggs are used extensively, the deeper the yellow shade of the yolks the more desirable they are for use in producing these items. As far as food value and baking characteristics are concerned, the color of the yolk appears to have no appreciable effect, however, the baker desires the deeper yellow yolk to lend color to the final product. In the past, it has been the practice to separate the yolks and whites of eggs by various means and the yolks are collected in buckets. After a hundred or so yolks have been accumulated, the batch is homogenized and that batch is graded according to color. It is seen that the color of the batch is the average color of all of the yolks which go to make it up.

Various color measuring means may be used to determine the color of this batch but, in practicing the most simple method, a porcelain paddle provided with various shades of color on its surface varying from a light yellow to a deep orange is used as a color comparator. The paddle is inserted in the batch until one of the strips of color on the paddle matches the color of the batch and in this manner the particular shade of the homogenized batch is determined.

As the color of the batch is merely an average of all the yolks collected in the bucket, it is seen that the best possible gradation for color is not had. In a batch of a hundred or so yolks, there will be as many light as dark colored ones and the value of the batch for the above mentioned bakery purposes is lessened as the lighter portions prevail. To overcome this defect, attempts have been made to grade the individual yolks for color before placing them in the batch. If this practice is perfected, it will be possible to selectively place all yolks having the desired deep yellow color in the same batch so that when the batch is homogenized, the average color will be always equal to or a deeper yellow than that color to which the individual yolks are graded.

Various methods of color comparison have been suggested for grading individual yolks before placing them in a particular container. However, none have been found to be practical in commercial operation. Among the suggested methods for accomplishing this was the use of a color chart paddle in connection with the separation of each yolk. The use of the paddle with each yolk proved to be very cumbersome and a time consuming operation and this method had to be discarded. It has also been suggested that the operator should memorize the color of the yolks and grade them by memory. The usual operator in following this method ordinarily spends an undue amount of time arriving at a decision and this method has likewise been found to be impractical.

The present invention provides a means for rapidly grading individual yolks for color and makes it possible to economically prepare a batch of yolks having a predetermined depth of color. Essentially this invention makes use of means for presenting a color comparator adjacent to an egg yolk as it is being separated from the white, the comparator being intimately associated with the separating means as will appear more fully below.

As the baker is particularly interested in using yolks which have a deep yellow color to give a better color to his final product, the gradation of the yolks, according to color for this trade, is based upon the determination that the yolk is of a color as deep as or deeper than a given shade. The present invention is shown as being adapted to the Seymour type egg separator and it provides a color comparison surface in position to be presented adjacent the yolk as the white is separated therefrom so that each individual yolk can be graded during separation. By means of the present device, the operator is enabled to inspect the yolk of each egg being treated in the cup as the white is trimmed from the yolk and, depending upon the depth of its color, the yolk may be dropped into an appropriate receptacle as soon as the trimming of the white has been completed.

Referring to Figure 1 the cooperation between an egg and a separator will be more readily visualized and after an egg has been dropped into a cup 10 which is of such a diameter that the yolk just neatly fits into the cup, the white may be trimmed from the yolk. The white overflows the edge of the cup and falls downwardly from the yolk and when the white has spilled over the sides of the cup, the trimming cap 11 is driven downwardly against the rim of the cup 10 to sever the white from the yolk. In the Seymour type egg separator, the trimming cap 11 is pivotally mounted on a base 12 and cup 10 is fixedly mounted on the support 13 integral with base 12. As the cap 11 approaches cup 10, the trimming edge 15 of the cap 11 approaches the edge 14 of the cup and the white is thus severed from the yolk. When the white is severed from the yolk as the surfaces 14 and 15 come into engagement, the white of the egg falls downwardly and is caught in suitable receiving means.

The severing or trimming means 11 is provided with an aperture 16 surrounding the trimming edge 15 and generally concentric therewith and as the white is being trimmed from the yolk, the yolk is projected somewhat through the aperture. During the separating process, when the edges 14 and 15 are in contact, the yolk fills the aperture and appears as a dome surrounded closely by the upper surface of the trimming means.

In accordance with the present teaching, the upper surface of the trimming means surrounding the aperture is colored with a suitable coating to provide a color comparator for grading the yolk, and the yolk being surrounded by and visible through the aperture may be readily compared with the color of the surface coating on the trimming means during the process of trimming the white from the yolk.

The yolk being separated from the white in this device is thus entirely surrounded by a single colored surface so that comparison can be readily made and grading can be quickly accomplished by the operator during the time it takes to trim the white from the yolk. Each individual yolk may be graded for color in comparison as to whether it is lighter or darker than the color of the comparator and the yolks can be separated more accurately according to their value to the baker. All the yolks of the deeper yellow color can be collected for the special uses of this trade.

In the form shown in the drawing, the Seymour separator is adapted for a breaking machine use. The cup is removably positioned over a vertical wall that moves past an egg breaking station by slipping base 12, which is formed of spaced members 17 and 18 thereon. The cup is provided with a handle 19 integral with the base. In using this form of the cup, the moving wall positions the cup under an egg breaking station so that the yolk drops into the cup 10. The trimming means 11 is operated to cut the white from the yolk and while the white is being trimmed, the cup is being conveyed past an attendant who inspects the egg. As soon as the white has been completely trimmed from the yolk, the attendant may lift the separator device from the moving wall and deposit the yolk in the appropriate collecting tub depending upon its color.

The use of the comparator surface integral with the upper surface of an egg separator makes it possible to accomplish simultaneously an inspection of the egg in general, separation of the white from the yolk, and gradation of the yolk for color. The integral association of the comparator with the separator wherein the color comparator surrounds an aperture through which the yolk may be viewed, provides a device for presenting the maximum possible area of the yolk in juxtaposition with the color comparison surface so that the speediest possible estimation of the color of the yolk can be made. Further, the device makes possible gradation for color at the same time as separation of the white takes place.

It is obvious that the egg separator can be made of any general form and the trimming means need not be operated in the specific manner shown. It is the purpose of this invention, however, to provide a color comparison surface which shall be formed upon means which may be presented to the maximum possible surface of the egg yolk in order to speed up the color classification process. The larger the area for color comparison that is in contact with the egg yolk, the more accurate will be the color selection and also the grading step may be appreciably speeded up.

This invention, therefore, provides a means for grading each individual yolk efficiently and rapidly so that all yolks of the deepest yellow color may be grouped together and the lighter yellows can be separated therefrom for sale to a trade to which color is unimportant.

The above shows one example of the preferred construction and manner of performing the present invention and many modifications will occur to those skilled in the art. All such modifications are considered to be within the scope of the following claim.

I claim:

A device for separating the white of an egg from the yolk and grading the yolk as to color, comprising a cup to receive the yolk, said cup being of such size that the white overflows the edge of the cup when the yolk is positioned in the cup, a movable trimming means having a surface for engaging the walls of the cup to trim the white from the yolk thereby assisting the separation, said trimming means having a relatively wide upper surface with an aperture therein through which the yolk may be seen when said trimming means is in engagement with the edge of the cup, said trimming means having a color comparison surface substantially covering the wide upper surface and extending to the edge of said aperture whereby a yolk disposed in said cup may be graded by comparison with said color chart as the white is being trimmed therefrom.

LEON D. MINK.